Patented June 30, 1942

2,288,309

UNITED STATES PATENT OFFICE 2,288,309

ALKALI-RESISTANT IRON BLUE PIGMENT

Edwin A. Wilson, Rutherford, N. J., and Irving Shack, Brooklyn, N. Y., assignors to Interchemical Corporation, New York, N. Y., a corporation of Ohio No Drawing. Application July 31, 1940,
Serial No. 348,990

6 Claims. (Cl. 106—304)

This invention relates to iron blue pigments, and has particular reference to an iron blue pigment resistant to the action of alkali. Specifically, this invention relates to iron blue pigment containing substantial percentages of nickel therein, in the form of basic insoluble nickel compounds, whereby the alkali resistance of the blue is considerably enhanced.

Iron blue is ordinarily made by precipitating a soluble ferro-cyanide with a ferrous salt, and oxidizing the resultant precipitate to ferric ferro-cyanide. This blue pigment is widely used in the coating and printing ink fields. One of its principal disadvantages is its unusually poor resistance to alkali. Each very weak alkalies will tend to destroy the color, and convert it into a colorless compound.

We have discovered that iron blues can be made considerably more alkali resistant by precipitating a basic water-insoluble nickel compound on the pigment, using sufficient nickel so that at least 0.1% is precipitated on the pigment.

In the practice of our invention, we find that the nickel should be added to the washed blue after the oxidation, since the high acid concentration necessary for oxidation causes any insoluble basic nickel salts to dissolve, and removes them. The nickel may be added as a normal salt, such as nickelous sulfate, to the blue slurry at about the neutral point; the blue pigment adsorbs some of the nickel, apparently as a basic insoluble compound, with a slight improvement in alkali resistance. However, sufficient nickel ordinarily cannot be deposited in this fashion, and we prefer to precipitate the nickel with alkaline materials such as soda ash, borax, the sodium phosphate, etc., care being taken, of course, that the blue is not attacked by the alkali.

About 0.1% of nickel must be deposited if any considerable improvement is to be observed. Higher quantities may be used; but the color strength of the product is progressively affected, so that we prefer not to use over 2% of nickel as metal, based on the pigment weight.

Typical examples of our invention are as follows:

EXAMPLE 1

Red shade blue

| | Pounds |
|---|---|
| Yellow prussiate of soda | 413 |
|   are dissolved in 350 gallons of water at 100° F. in a 2500 gallon tank, equipped with agitator runnig at 16 R. P. M. | |
| Copperas, dissolved in 350 gallons of water at 100° F | 356 |
|   are run in. The mixture is stirred one hour, brought to a boil, held one hour, and then there is added | |
| Ammonium sulfate in 100 gallons of water | 236 |
|   Boil fifteen minutes. Add | |
| Sulfuric acid 60° Bé | 215 |
|   and | |
| Nitric acid 42° Bé | 2 |
|   in 30 gallons of water, followed by | |
| Sodium bichromate in 25 gallons water | 9½ |
|   Shut off steam. Stir one hour. Wash by flooding and decantation until supernatent liquor has an acid normality of about 1/125. Add | |
| Yellow prussiate of soda in 25 gallons of water at 100° F | 30 |
| Ammonium hydroxide 26° Bé. in 25 gallons of water | 52 |
| Sodium chlorate in 50 gallons of water at at 150° F | 90 |

This is a typical red shade iron blue, and is extremely sensitive to alkali.

EXAMPLE 2

Green shade blue

| | Pounds |
|---|---|
| Yellow prussiate of soda | 344 |
|   and | |
| Ammonium sulfate | 72 |
|   Dissolved together in 1000 gallons of water at boil in 2500 tank, equipped with agitator running at 16 R. P. M. Run in rapidly | |
| Copperas in 120 gallons of water at a boil | 340 |
|   Boil ½ hour. Add | |
| Sulfuric acid 60° Bé | 168 |
|   Followed by | |
| Sodium chlorate dissolved in 20 gallons of water | 24 |
|   Boil five minutes. Shut off steam, and let color stand for fourteen hours before flooding. Wash by decantation and flooding until supernatent liquor has an acid normality of about 1/125. | |

Add ammonium hydroxide to pH of about 6.8. This blue, like the last, is sensitive to alkali.

EXAMPLE 3

Adsorption of nickelous sulfate

To the slurry of Example 1, add 10 pounds of nickelous sulfate ($NiSO_4 \cdot 6H_2O$), stir 30 minutes, filter press, dry and pulverize. The resultant blue contains considerably less nickel than was added, but some is deposited, and the pigment has some measure of alkali resistance.

Similar results are obtained with a similar treatment of the slurry of Example 2.

EXAMPLE 4

*Sulfate and oil*

When the slurry of Example 1 or of Example 2 is treated with 10 pounds of nickelous sulfate, followed by an emulsion of 12 pounds mineral oil and 3 pounds of sodium salt of sulfonated mineral oil in 50 gallons of water, the results are slightly better than in Example 3. The oil is deposited on the pigment together with the nickel.

EXAMPLE 5

To the slurry of Example 1 or 2, add 10 pounds of nickelous sulfate, and then 12 pounds of soda ash. A very marked improvement in alkali resistance is obtained.

EXAMPLE 6

When mineral oil is added after the soda ash in Example 5, using the same emulsion as in Example 4, the alkali resistance is somewhat further improved.

The products of Examples 5 and 6, where the nickel content is about 1.0%, are slightly weaker (about 5%) than the original blue pigment. However, optimum results for alkali resistance are obtainable at about 1.0 to 1.5% nickel. Since the weakening effect is increased almost linearly with increasing quantities of nickel, while further increase in alkali resistance is not so marked, we prefer to use no more than 2.0%. Larger quantities may of course be used if loss of color strength is not objectionable in any instance.

While only two iron blues are shown, such pigments of all types may be treated by our method to get improved alkali resistance. Furthermore, the nickel may be obtained from any soluble source, being effective so long as it is deposited as an insoluble basic nickel compound in sufficient quantity.

The use of mineral oil, exemplified in Example 6, seems to insure more even distribution of the nickel. Other non-volatile water-insoluble film-forming liquids may be used—for example, fatty oils. The liquid should be added in small quantities (0.5 to 10%).

Examples of our invention can obviously be multiplied without departing from the scope thereof as defined in the claims.

We claim:

1. An iron blue pigment of improved alkali resistance, comprising ferric-ferro-cyanide particles having deposited thereon small amounts but at least 0.1% of nickel in the form of a basic water-insoluble compound.

2. An iron blue pigment of improved alkali resistance, comprising ferric ferro-cyanide particles having deposited thereon 0.1 to 2.0% of nickel in the form of basic water-insoluble compound.

3. An iron blue pigment of improved alkali resistance, comprising ferric ferro-cyanide particles having deposited thereon 1.0 to 1.5% of nickel in the form of a basic water-insoluble compound.

4. An iron blue pigment of improved alkali resistance, comprising ferric ferro-cyanide particles having deposited thereon small amounts, but at least 0.1% of nickel in the form of a basic water-insoluble compound, the pigment particles being coated with 0.5 to 10% of a non-volatile water-insoluble film-forming liquid.

5. An iron blue pigment of improved alkali resistance, comprising ferric ferro-cyanide particles having deposited thereon 0.1 to 2.0% of nickel in the form of a basic water-insoluble compound, the pigment particles being coated with 0.5 to 10% of a non-volatile water-insoluble film-forming liquid.

6. An iron blue pigment of improved alkali resistance, comprising ferric ferro-cyanide particles having deposited thereon 1.0 to 1.5% of nickel in the form of a basic water-insoluble compound, the pigment particles being coated with 0.5 to 10% of a non-volatile water-insoluble film-forming liquid.

EDWIN A. WILSON.
IRVING SHACK.